United States Patent
Weisswange et al.

(10) Patent No.: US 9,708,004 B2
(45) Date of Patent: Jul. 18, 2017

(54) METHOD FOR ASSISTING A DRIVER IN DRIVING AN EGO VEHICLE AND CORRESPONDING DRIVER ASSISTANCE SYSTEM

(71) Applicant: HONDA RESEARCH INSTITUTE EUROPE GMBH, Offenbach/Main (DE)

(72) Inventors: Thomas Weisswange, Offenbach (DE); Jannik Fritsch, Offenbach (DE); Christian Goerick, Offenbach (DE); Edoardo Casapietra, Frankfurt am Main (DE)

(73) Assignee: HONDA RESEARCH INSTITUTE EUROPE GMBH, Anan-Shi (JP)

( * ) Notice: Subject to any disclaimer, the term of this patent is extended or adjusted under 35 U.S.C. 154(b) by 0 days.

(21) Appl. No.: 14/990,982

(22) Filed: Jan. 8, 2016

(65) Prior Publication Data
US 2016/0214647 A1    Jul. 28, 2016

(30) Foreign Application Priority Data
Jan. 23, 2015  (EP) ..................................... 15152327

(51) Int. Cl.
*B62D 15/02* (2006.01)
*G08G 1/0965* (2006.01)
(Continued)

(52) U.S. Cl.
CPC ......... *B62D 15/029* (2013.01); *B60W 30/095* (2013.01); *B60W 30/10* (2013.01);
(Continued)

(58) Field of Classification Search
CPC . B62D 15/025; B62D 15/029; B60W 30/095; B60W 30/10; B60W 40/04;
(Continued)

(56) References Cited

U.S. PATENT DOCUMENTS

| | | | |
|---|---|---|---|
| 7,379,815 B2 | 5/2008 | Kobayashi et al. | |
| 8,538,675 B2 * | 9/2013 | Richardson | G06K 9/00785 701/301 |

(Continued)

FOREIGN PATENT DOCUMENTS

| | | |
|---|---|---|
| DE | 10 2012 214 206 A1 | 2/2014 |
| DE | 10 2013 203 239 A1 | 8/2014 |

(Continued)

OTHER PUBLICATIONS

Gindele et al., "Bayesian Occupancy Grid Filter for Dynamic Environments Using Prior Map Knowledge", 2009 IEEE Intelligent Vehicles Symposium, Jun. 2009, pp. 669-676.*
(Continued)

*Primary Examiner* — Todd Melton
(74) *Attorney, Agent, or Firm* — Squire Patton Boggs (US) LLP (57) ABSTRACT

An environment of an ego vehicle is physically sensed and sensor data is produced. A representation of the environment is generated. The representation includes a plurality of representation segments each of which corresponds to a limited area of the environment. Characteristic information is generated for at least a part of the limited areas of the environment and the characteristic information is assigned to the representation segment which corresponds to the respective area of the environment. Furthermore, future or past movement behavior for a traffic object is estimated and characteristic information for at least one limited area of the environment is inferred based upon the estimated movement behavior. This characteristic information is assigned to the representation segment corresponding to the respective area of the environment and an evaluation is performed for determining a preferred path for the ego vehicle. An assistance signal based on the determined path is output.

16 Claims, 3 Drawing Sheets

(51) Int. Cl.
*B60W 30/095* (2012.01)
*B60W 30/10* (2006.01)
*B60W 40/04* (2006.01)
*B60W 40/06* (2012.01)
*G06K 9/00* (2006.01)

(52) U.S. Cl.
CPC ............ *B60W 40/04* (2013.01); *B60W 40/06* (2013.01); *B62D 15/025* (2013.01); *G06K 9/00791* (2013.01); *G08G 1/0965* (2013.01)

(58) Field of Classification Search
CPC . B60W 40/06; G06K 9/00798; G08G 1/0965; G06T 2207/30261
See application file for complete search history.

(56) References Cited

U.S. PATENT DOCUMENTS

| | | | | |
|---|---|---|---|---|
| 8,744,744 | B2* | 6/2014 | Takagi | B60W 40/04 701/301 |
| 9,429,650 | B2* | 8/2016 | Zeng | G01S 13/867 |
| 2013/0238181 | A1 | 9/2013 | James | |
| 2015/0003683 | A1* | 1/2015 | Grewe | H04N 5/23232 382/104 |
| 2015/0154328 | A1* | 6/2015 | Michalke | G06F 17/5009 703/1 |

FOREIGN PATENT DOCUMENTS

| | | |
|---|---|---|
| EP | 2 289 754 A1 | 3/2011 |
| EP | 2 574 958 A1 | 4/2013 |
| EP | 2 615 598 A1 | 7/2013 |
| GB | 2507152 A | 4/2014 |
| WO | WO 2014/131666 A1 | 9/2014 |

OTHER PUBLICATIONS

European Search Report dated Jul. 14, 2015 corresponding to European Patent Application No. 15152327.1.

U. Handmann et al., "Scene Interpretation and Behavior Planning for Driver Assistance," Proceedings of SPIE, SPIE—International Society for Optical Engineering, US, vol. 4023, Jun. 24, 2000, pp. 201-212, XP002500734.

Robert Kastner et al., "Detection and motion estimation of moving objects based on 3D-Warping," Intelligent Vehicles Symposium (IV), 2011, IEEE, Jun. 5, 2011, pp. 48-53, XP031998911.

* cited by examiner

METHOD FOR ASSISTING A DRIVER IN DRIVING AN EGO VEHICLE AND CORRESPONDING DRIVER ASSISTANCE SYSTEM

BACKGROUND

Field:

The invention relates to a method for assisting a driver in driving a vehicle and a corresponding driver assistance system.

Detailed Description of the Related Art:

In recent years, a great progress has been achieved with respect to autonomous driving or at least assisting a driver in driving by presenting information that the driver himself is usually not capable of recognizing while driving has been made. On the one hand, this increased the comfort for the driver because he can concentrate on things that still need to be done by the driver himself while on the other side such systems assist the driver for example by keeping a speed constant at a value that was previously set by the driver. Systems have been developed which are not capable of maintaining a constant speed only but also take into consideration the environment of the ego vehicle that is equipped with such a system. In order to achieve this object the ego vehicle is equipped with sensing means that can obtain information from the environment of the ego vehicle. By evaluating this information, the ego vehicle is for example capable of recognizing a vehicle driving right in front of the ego vehicle but with a lower speed. As a consequence, it is determined by the ego vehicle's driver assistance system that maintaining the current speed would lead to a collision with the predecessor of the ego vehicle. Thus, the ego vehicle can automatically be slowed down and the speed can be adjusted so that the ego vehicle follows its predecessor at a constant gap. Such cruise control is a simple example of a driver assistance system and shows only the first step on a long way of development part of which only has been gone. While the sensing means was used in the beginning only for fulfilling simple tasks during the process of further developments, it was recognized that additional information can be derived from the environment which is physically sensed by such system. Examples are predictions of future trajectories of other traffic participants as it is described for example in US 2013/0238181 A1. But not only the relative speed and direction of the other traffic participants can be estimated on the basis of signals of radar systems or video cameras that physically sense the environment of the ego vehicle, but also static traffic elements can be detected.

Examples for such static traffic elements are lane markings or the like. Furthermore, by evaluation of the behavior of the other traffic participants, additional information can be obtained that describe a scene the ego vehicle is part of. For example it is possible to analyze the relative positions and velocities of other traffic participants like other vehicles and thus, conclude where neighboring lanes of a multi lane road are. Such approach is described in U.S. Pat. No. 7,379,815 B2. Another approach is described in 10 2012 214 206 A1 where it is disclosed that a lane curvature can be derived from car positions of other traffic participants.

One big disadvantage of all these systems and further systems that may exist relying on the capability of sensing means mounted on an ego vehicle is that the information the system may obtain is limited to anything that can be derived directly from elements, vehicles, persons, that are visible to the sensing means. But in many cases it would of course be interesting and may be highly relevant for an analysis of a traffic situation what is hidden by other objects or what lies outside the sensing range of the sensor means. Such hidden areas are in particular interesting in case that for example an occupancy grid is generated, thus providing the system with information which areas are usable by the ego vehicle. Such occupancy grids are often used in order to plan a path which is suitable for the ego vehicle in order to move on from its current position to an intermediate way point that lies for example on a route that was calculated by a navigation system. With such path planning, the driver is assisted for example by presenting him information guiding him through an area corresponding to a representation of the environment such as for example a two dimensional map. Two dimensional maps itself is of course known for example from navigation systems but such navigation systems cannot be a basis for the path planning for the ego vehicle since the information included in such a navigation map is limited to a very coarse definition of roads and buildings. The actual boundaries such as a pavement next to a road for example is not included as information in the navigation map. But for path planning which is performed on a different level of details in a close surrounding, it is essential that in fact the concrete paths through the near surrounding of the ego vehicle is possible. Thus, for such path planning it would be highly relevant if there are for example obstacles or areas where the vehicle cannot drive on like pavements and the like.

SUMMARY

Thus, it is an object of the present invention to improve assisting a driver in driving an ego vehicle and provide an improved driver assistance system that is capable of finding a path through a nearby surrounding of the ego vehicle. This object is achieved by the method and the driver assistance system according to the present invention.

According to the present invention the driver assistance system uses sensor means for physically sensing an environment of the ego vehicle on which the driver assistance system is mounted. The sensing means may consist of a single sensor system or a plurality thereof. Examples for such sensor systems are lidar/radar, a video camera or the like. The system further comprises a representation generation unit in order to generate a representation of the environment of the ego vehicle. This representation consists of a plurality of representation segments. Each of these representation segments corresponds to a limited area of the environment. The representation generation unit is capable of analyzing the sensor data in order to generate characteristic information for at least a part of the limited areas of the environment. Such characteristic information are also called labels that could be for example "occupied", "free", "car", "road", "walkway", "zebra crossing", "occluder" and the like. Such information can be derived from the sensor data that is produced by the sensor means by determining for example that there is a vehicle driving at a velocity different from zero. This gives the information that on the one hand the area where the vehicle currently drives is occupied and furthermore that this area must be a road. On the other hand if no object can be detected for a particular area of the environment it can be concluded that this area is free. Such characteristic information which is thus derived from the sensor data is then assigned to the representation segment that corresponds to the respective area of the environment for which the characteristic information (label) has been determined.

Since the range of the sensor means is limited and thus only a limited part of the environment of the ego vehicle can be perceived some parts of the representation cannot be labeled on the basis of the sensor data. In particular there may be some areas where no characteristic information can be determined from the sensor means because of objects that occlude the area behind the object and thus these areas are not visible for sensing.

In order to determine additional characteristic information that gives information going beyond what is derivable from the sensor means the system comprises an estimation unit for estimating a future and/or past movement behavior of a traffic object that is sensed by the physical sensing means. For determination of the future movement behavior for such traffic objects, in most cases a traffic vehicle, prediction systems as known in the art may be used. On the other side the estimation of the movement behavior of a traffic object may also consider the past. For example if the traffic object for which an estimation shall be conducted shows up behind an object that prevented the traffic object to be sensed before by the sensor means it can be derived from the current velocity and heading direction from where the vehicle originally came. Thus, on the basis of the current driving status of the vehicle an estimation for its previous positions can be made.

Additional characteristics for at least one limited area of the environment can then be inferred on the basis of the estimated movement behavior. This means for example that from a predicted trajectory of the vehicle it can be assumed that the vehicle drives on a road surface and thus, even if the area along the trajectory which is predicted for the traffic object is not visible for the sensor means, it can be concluded that a road must be present there. This characteristic information or label is then assigned to the respective representation segment in the representation of the environment. Thus, the representation of which already some representation signals are labeled with labels derived from the analyzed sensor data is supplemented by labels that are derived using an estimation of the movement behavior of a traffic participant.

The resulting representation including characteristic information derived in these two alternative ways is then used for evaluation in order to determine a preferred path for the ego vehicle. The evaluation is thus based on a representation that includes more information than only what is directly derivable from the scene as visible for the sensor means. The range for which the preferred path can be determined is thus extended. When such preferred path for the ego vehicle is determined, an assistance signal is generated based thereon and output.

Additional aspects of the invention are claimed in the dependent claims.

In particular it is preferred to determine a most likely trajectory as a movement behavior of the traffic object. If the most likely trajectory is used, the output of already known prediction systems can be used directly since the result of the known prediction systems are particularly configured to output such trajectory. As an alternative a position probability distribution for the traffic object may be calculated as a movement behavior.

Furthermore it is advantageous to use as a representation a metric top-down view. This makes it easy to use the labels in addition to information of a map that can be derived from a navigation system for example. In order to ensure an easy processing of the data it is then particularly preferred to use a regular grid of such metric top-down view map. Thus, the representation segments that are used for labeling in the representation define a regular grip.

Furthermore, it is advantageous that before characteristics are inferred on the basis of the estimated movement behavior it is determined for which representation segments no characteristic information could be derived from the sensor data directly. For example after the sensor data is analyzed by the system and the characteristic information that could be derived was assigned to the representation segments, representation segments that have not been labeled in that step are labeled as "unknown". The system is then configured to limit inferring characteristics on the basis of the estimated movement behavior to those areas of the environment that correspond to the representation segments that are labeled as "unknown".

For the determination of the preferred path it is preferred to generate a plurality of possible paths through the representation by which the current position of the ego vehicle is connected to a predetermined way point. Then the quality of each of this plurality of possible paths is evaluated. The quality of a possible part is determined as a measure taking into account quality values that describe the usability of each of the representation segments along the respective path. A low quality value can for example be defined for a representation segment that is labeled "occupied", i.e. if the possible path crosses this representation segment a collision between the object that occupies the limited area corresponding to the representation segment which is labeled as "occupied" would occur most probably. On the other side a high quality value may be considered for a representation segment for which it is clear that all wheels of the ego vehicle would stay on the road if the possible path would cross this representation segment. It is clear that for any of the labels that are used to provide a semantic description of the environment within the representation such quality values may be defined. Also for combinations of labels that are also possible because each representation segment can be labeled with a plurality of labels a particular a quality value may be assigned to such representation segment. The quality values for the representation segments are thus defined on the basis of the labels that are assigned to the representation segment.

Alternatively the preferred path may be determined by selecting stepwise representation segments starting from the ego vehicle's current position. This means that starting from the representation segment that is defined by the current position of the ego vehicle, only the next representation segments to which the ego vehicle could drive further are considered when selecting the next part of the path. Then starting from a selected representation segment again the next representation segments that are possible representation segments for a path targeting an intermediate way point are evaluated and a proper one is selected. This is repeated until the intermediate way point is reached.

BRIEF DESCRIPTION OF THE DRAWINGS

Details of the invention and also further aspects will be described now with reference to the annexed drawings.

In the drawings there is shown in

DETAILED DESCRIPTION

Figure 1:
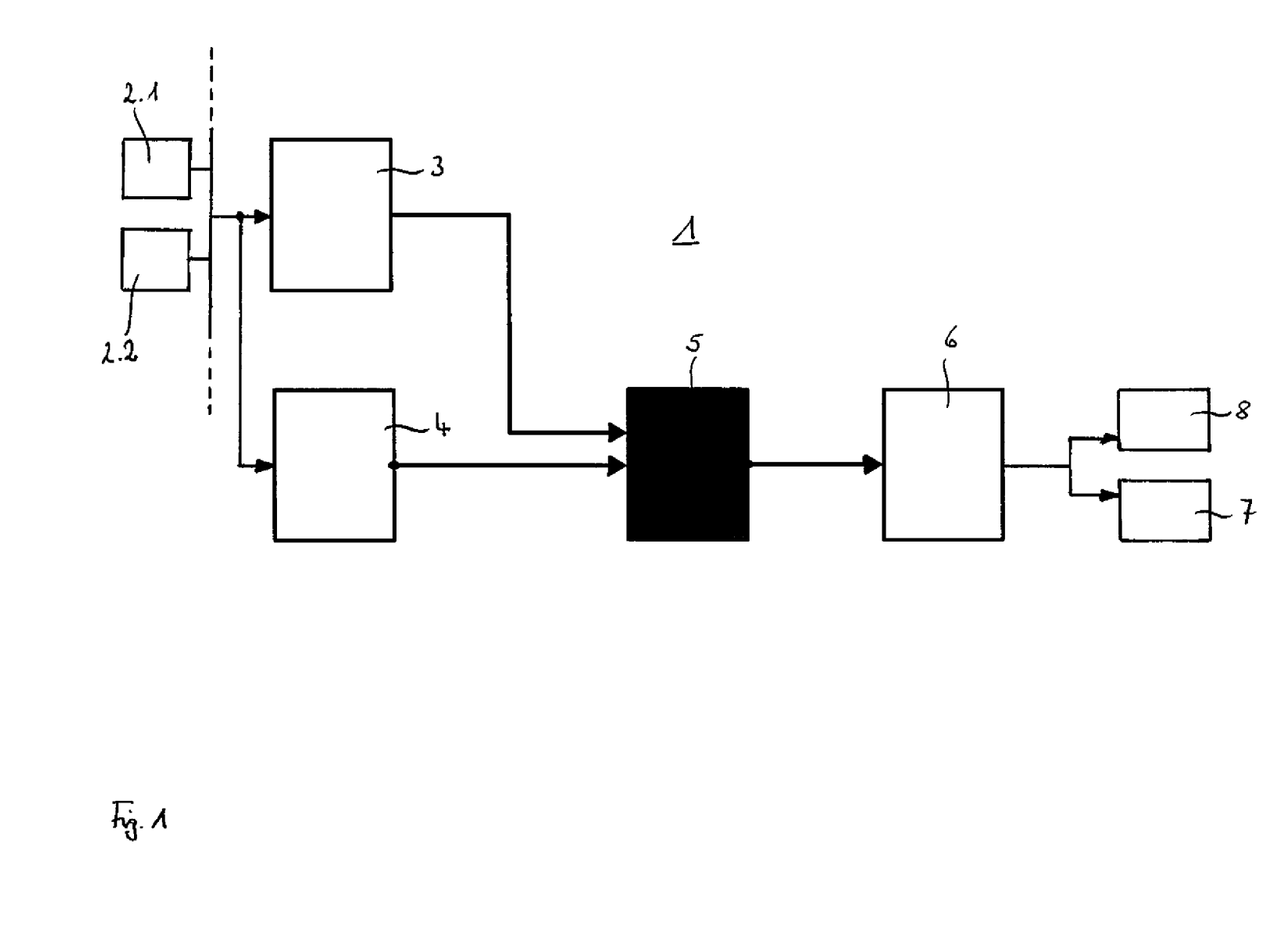
FIG. 1 an overview of the driver assistance system according to the invention.

FIG. 1 shows a driver assistance system that is used for assisting a driver in driving a car. The system 1 comprises sensing means including sensors 2.1, 2.2. As it is indicated sensing means may comprise additional sensors which are not illustrated in the drawing. Of course, it is also possible that only one sensor 2.1 is used. The sensors 2.1, 2.2 are for example LIDAR sensors, radar sensors, video cameras or the like. The sensors may be used to cover different areas of the environment of the ego vehicle and may be of the same type or of different types. The sensors 2.1, 2.2 generate sensor data that convey information about the environment of the ego vehicle. The area that is covered by the sensors 2.1, 2.2 in particular cover the forward driving direction of the ego vehicle. The sensor data are supplied to a representation generation unit 3. In the representation generation unit 3, the sensor data are analyzed which will be explained later in detail with reference to FIG. 2. The representation which is generated in the representation generation unit 3 is then forwarded to an inference unit 5.

The sensor data generated by sensors 2.1, 2.2 are not only supplied to the representation generation unit 3 but also to an estimation unit 4 that estimates based on the sensor data, a future movement behavior and/or a past movement behavior of at least one traffic participant which in most cases will be another vehicle that is sensed by the sensors 2.1, 2.2. Again, the estimation of such movement behavior of another traffic object will be explained later in detail. It is to be noted that preferably the movement behavior of all traffic objects that can be identified on the basis of the sensor data is used and for each of the traffic participants that can be recognized from the sensor data, a movement behavior is determined. As a result, the estimation unit 4 outputs information on the movement behavior of the traffic objects which is supplied as an input to the inference unit 5.

In the inference unit 5, the representation as generated by the representation generation unit 3 is supplemented with information derived from the estimated movement behavior of the other traffic objects. The result is a supplemented representation that is output by the inference unit 5 and transferred to a path evaluation unit 6. In the path evaluation unit a preferred path for the ego vehicle is calculated and an assistance signal is generated based thereon. The assistance signal conveys information about for example a suggested steering angle and suggested acceleration/deceleration of the ego vehicle. The assistance signal is then further supplied to an actuation means 7 and/or information means 8. The actuation means 7 is capable of automatically performing an action influencing the driving status of the vehicle. For example having in mind autonomous driving systems the steering can be actuated. Other actuation means 7 are for example a throttle or a brake system. Alternatively or additionally, the assistance signal is supplied to the information means 8 that does not act directly on the driving status of the ego vehicle, but presents information to the driver of the ego vehicle. Thus, on the basis of such information, the driver himself can decide to follow such suggestion or to overrule the system and act differently. For example, a warning signal can be output in order to encourage the driver to decelerate or arrows can be used to inform about an advantageous driving direction for example to avoid obstacles.

Figure 2:
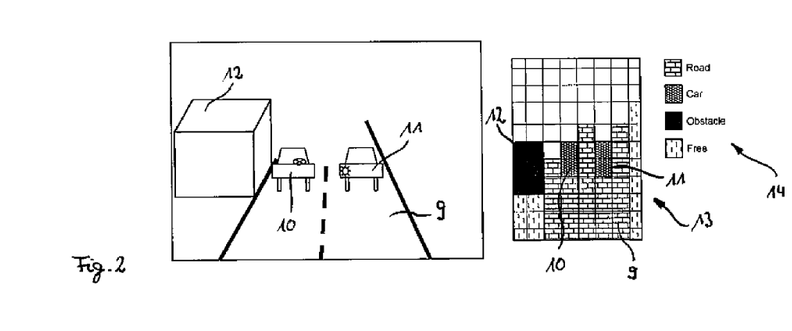
FIG. 2 a schematic to illustrate the generation of a representation of the environment using a label derived from sensor data.

The left part of FIG. 2 shows in a simplified manner a scene as it can be sensed by the sensors 2.1, 2.2. On a road 9 that may be identified by a camera system and its image processing a first traffic object 10 and a second traffic object 11 other than the ego vehicle can be determined. The current speed and direction of the first vehicle 10 and the second vehicle 11 can be determined by use of a radar sensor 2.2 for example. The identification of the road 9 itself may be performed by evaluating lane markings in the image processing. Furthermore, a building 12 can be identified on the left side. On the basis of the sensor data which an input into the representation generation unit 3 a representation 13 is generated. As it can be seen in the representation 13, the representation is made up of a plurality of representation segments that define a regular grid in a metric top-down view of a part of the environment of the ego vehicle. Each representation segment corresponds to a limited area of the ego vehicle's environment. At the right most side of FIG. 2, different labels or characteristic information that is derived in the representation generation unit 3 from the sensor data is shown. In the present case, four different labels represent the characteristic information. At first there is the label "road" that can be derived from the image processing as indicated earlier. Of course in addition to the processed image also information supplied from a navigation system can be used in order to identify areas which have to be considered as "road".

Second, a label "car" is assigned to those representation segments or grid cells that correspond to the position where the first traffic object 10 and the second traffic object 11 are at the current point in time. The building 12 is identified as an area where no driving for the ego vehicle is possible and thus is labeled with "obstacle". Finally, the area which is right of the road or left of the road in front of the building 12 is labeled as being "free". Such label identifies for example an area that cannot be described by any of the other labels but where driving has to be considered as not being possible.

As it can be seen from the representation 13, the sensors 2.1, 2.2 are capable only of sensing a limited area of the environment and thus, the labeling is also limited to the representation segments corresponding to the visible portion of the environment. The grid cells that are empty in representation 13 thus do not include any information that might be evaluated for path planning.

According to the invention characteristic information of the environment is assigned to at least a part of these representation segments in order to improve the path planning and thus the assistance of the driver of a car. Path planning based on the representation 13 only which is the result of an analysis of the sensor data directly of course is limited to those parts of the representation 13 where information is available. On the other side it is of course possible to assign a plurality of labels to the representation segments contrary to what is illustrated in representation 13. For example the representation segments that correspond to "car" may in addition have the label "road" as it is clear that the cars driving there currently are on a road.

Figure 3:
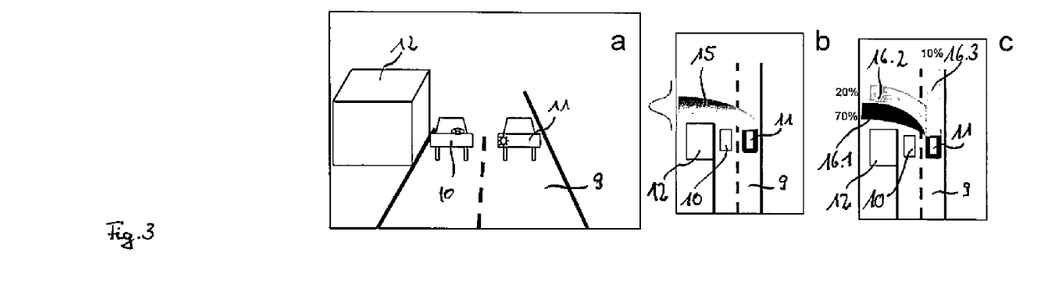
FIG. 3 an illustration to explain the inference of labels on the basis of predicted trajectories of a traffic participant.

Coming now to FIG. 3 the estimation of the movement behavior of the second traffic object 11 shall be explained. In the present case this is a prediction of the future movement behavior of the second traffic object 11. From the sensor data the current position, current velocity, heading, light signals and the like is known to the system. In addition the system has information about applicable traffic rules and local information structure. As it is known for future movement behavior prediction systems, the relations to other traffic participants are exploited in order to predict a future movement behavior of a particular target object here the second traffic object 11. In general this can be done in two different ways which are illustrated in FIGS. 3b and 3c. In FIG. 3b a probability distribution over space positions is calculated whereas in FIG. 3c a plurality of fixed spatial trajectories is calculated. To each of these spatial trajectories a probability is assigned. On the basis of this predicted future movement behavior it is then possible to derive characteristic information even for representation segments where a direct analysis of the sensor data was not possible. As indicated in FIG. 3a for the second traffic object 11 a turn signal is identified and thus the prediction assumes that the second traffic object 11 will turn to the left. From the fact that there is an obstacle, building 12, it thus has to be derived that the trajectory of the second traffic object 11 is behind the building 12. Thus, from the trajectories as indicated by the thick black lines 15 in FIG. 3b or 16.1 which is the most likely trajectory in FIG. 3c it has to be assumed that these trajectories follow a drivable area which in most cases will be a road. Taking furthermore into consideration the width of the second traffic object 11 a dimension of such road can be estimated.

Figure 4:
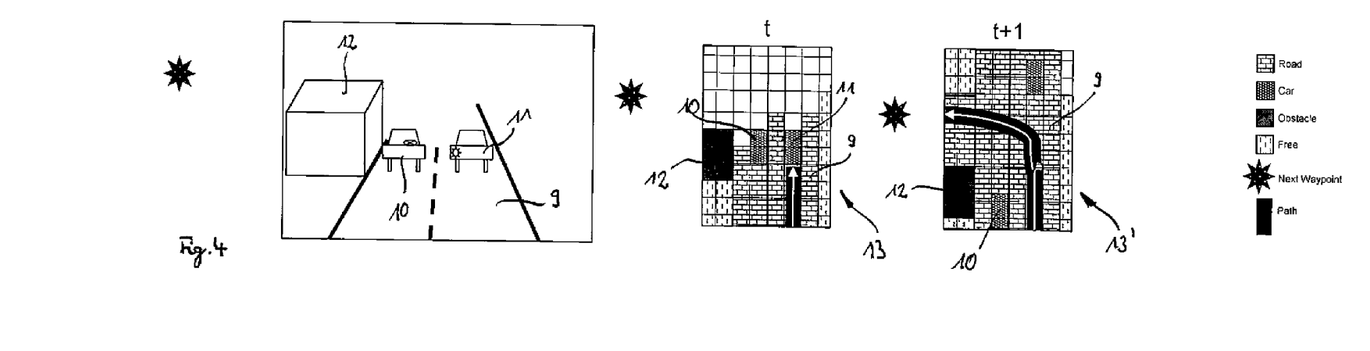
FIG. 4 an illustration to explain the effect of supplementing the representation of FIG. 2 on the basis of the predicted trajectory.

Going now to FIG. 4 which on the leftmost side again shows the scene as it is sensed by the sensor means, the use of such additional information is explained. In the middle of FIG. 4 there is shown again the representation 13 as it is generated by the representation generation unit 3 which corresponds to already known representation generation. A time horizon for which a path for the ego vehicle can be planned is very limited because not all of the representation segments of the representation 13 include information that might be exploited. Indicated by the star on the left side of the representation 13 is an intermediate waypoint which might for example be an intermediate waypoint derived from a navigation system that coarsely defines the way of travel of the ego vehicle. As can be seen from representation 13 the path (thick black line) planning for the ego vehicle already ends right behind the predecessor of the ego vehicle which is the second vehicle 11.

Coming now to the representation 13' as it is achieved and then used for path planning according to the present invention, information derived from the predicted future movement behavior of the second traffic object 11 is used to supplement the representation 13 with labels for at least a part of those representation segments that are empty in representation 13. In particular on the basis of the future movement behavior of the second traffic object 11, it can be assumed that behind the building 12 there must be a road. Thus, the labels that previously have been empty are now assigned the label "road". As it has been indicated earlier, the width of the second traffic object 11 maybe used in order to define the dimension of the road and thus a more precise planning of the path for the ego-vehicle is possible. Furthermore—not illustrated in the drawings—it can be derived from the velocity of the first traffic object 10 and its driving direction that the first traffic object 10 before the point in time t must have been driven straight and therefore from such estimation of the past movement behavior of the first traffic object 10 it can be derived that the road 9 obviously does not end at the end of the sensor range. As a result it can be derived that a t-crossing is ahead of the current position of the ego-vehicle and path planning can be performed on the basis of this information.

As it is indicated by the black line in the rightmost part of FIG. 4 a path heading towards the star which again indicates an intermediate waypoint can be planned. The planning of such path can be performed either by at first defining a plurality of possible paths and evaluating the quality of these different paths and then choosing the one with the highest quality. Another option is to build the path piecewise starting from the current position of the ego-vehicle. The path is then continuously extended in the direction of adjacent representation segments having the highest quality. The direction for such evaluation of the representation segments is given by the intermediate way point which is the target for path planning.

The determination of the preferred path uses quality values that are assigned to the representation segments on the basis of the labels that are assigned to these representation segments. For example a low quality value for a representation segment is given for the area that is covered by an obstacle such as the building 12. A high value for the quality will be assigned to representation segments that are labeled with "road". Such quality value can be particularly high for the lane of the own driving direction.

Of course there might still be a representation segment for which no label could be identified. Such representation segments are areas of unknown quality and thus potentially could lead to dangerous situations. Thus, when the preferred path is determined it is taken also in consideration which of the representation segments should be avoided being traversed by the preferred path for the ego-vehicle.

As it is evident by a comparison of the middle part of FIG. 4 and the rightmost part of FIG. 4 the path that may be planned on the basis of the representation map as generated in line with the present invention is much longer than the preferred path that can be determined on the basis of the representation 13 using only characteristic information or labels directly analyzed from the sensor data. This results in a much smoother control because of the longer planning horizon until the point in time t+1 instead of t.

It is to be noted that the labels that are derived from the estimated movement behavior take into consideration for example the type of the traffic objects that is the basis for identifying a label, the past behavior of the traffic object that is sensed, the local surrounding of the traffic objects and the probability of the prediction at this point. The representation segments along a predicted trajectory of a car for example can be labeled "road" as in the example given above. It also could be labeled with a particular lane type on the basis of a driving direction of the traffic object. Areas for which a prediction probability is below a predetermined threshold could for example be assigned "non-road". This is the case in the upper left corner of representation 13' of FIG. 4 for example.

Furthermore, the labels itself can get assigned a probability value based on the above features. For example such probability value may be high if the probability for a particular trajectory is extremely high compared to its alternatives. If a plurality of trajectory alternatives for the second traffic objects 11 are pretty much the same than it could be derived that the label may also have a low probability. The resulting representation 13' as shown in the rightmost part of FIG. 4 is also called a semantic environment representation and includes information extending beyond the visible areas such as the areas that are hidden by the building 12 as explained above.

It is to be noted that characteristic information desired from the estimation of movement behavior can also be used to supplement labeling of representation segments that are labeled on the basis of direct analysis of the sensor data.

Figure 5:
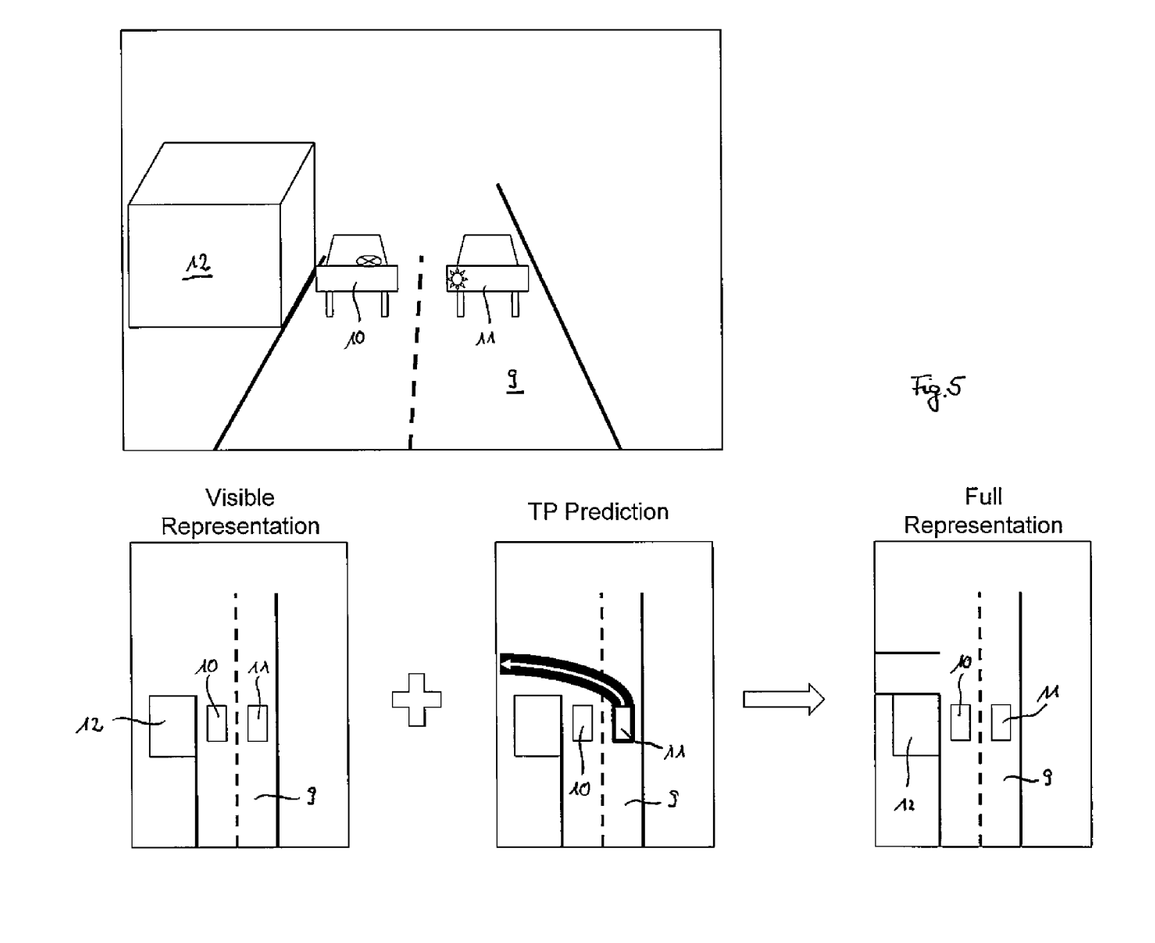
FIG. 5 a schematic for illustrating how a representation of the environment is achieved according to the invention.

Finally, FIG. 5 summarizes the approach according to the present invention. The upper part of FIG. 5 again shows the situation as it is visible for the sensing means 2.1, 2.2. Directly from the sensor data, a representation is generated as indicated with reference numeral 13. This representation is supplemented with information taken from the estimation of movement behavior of a traffic participant, in the illustrated case of the second traffic object 11. This supplementary information or labels lead to the full representation indicated with reference numeral 13' which is then used for path planning for the ego vehicle.

It is to be noted that in addition to the path planning for the ego vehicle the resulting representation may be evaluated by the path evaluation unit 6 to determine a possible path for a traffic object other than the ego vehicle.

The invention claimed is:

1. Method for assisting a driver in driving an ego-vehicle, comprising the steps of:
   physically sensing an environment of the ego-vehicle and producing sensor data;
   generating a representation of the environment, the representation comprising a plurality of representation segments each of which corresponds to a limited area of the environment;
   analyzing the sensor data for generating structural characteristic information of the environment for at least a part of the limited areas of the environment;
   assigning the structural characteristic information to the representation segment corresponding to the respective area of the environment;
   determining for which of the limited areas of the environment no structural characteristic information is generated from the sensor data or structural characteristic information is to be supplemented;
   estimating a future or past movement behavior for a traffic object sensed by the physical sensing;
   inferring structural characteristics of the environment for at least one determined limited area of the environment on the basis of the estimated movement behavior;
   assigning at least part of the structural characteristic information inferred on the basis of the estimated movement behavior to the representation segment corresponding the respective area of the environment;
   evaluating the resulting representation comprising the representation segments including all assigned structural characteristics for determining a preferred path for the ego-vehicle; and
   generating and outputting an assistance signal based on the determined path.

2. Method according to claim 1, wherein
as movement behavior for the traffic object a most likely trajectory is calculated.

3. Method according to claim 1, wherein
as a movement behavior for the traffic object a position probability distribution is calculated.

4. Method according to claim 1, wherein
the representation is a metric top-down view.

5. Method according to claim 4, wherein
the representation segments define a regular grid.

6. Method according to claim 1, wherein inferring structural characteristic information on the basis of estimated movement behavior is performed only for limited areas of the environment corresponding to representation segments that do not have assigned structural characteristic information derived by analyzing the sensor data.

7. Method according to claim 1, wherein
the preferred path is determined by generating plurality of possible paths through the representation connecting a current position of the ego-vehicle with a predetermined waypoint and evaluating on the basis of their quality which is determined as a measure taking into account quality values that describe the usability of each of the representation segments for driving along the respective path.

8. Method according to claim 1, wherein
the preferred path is determined by selecting representation segments step by step starting from the ego-vehicles current position.

9. Method according to claim 1, wherein
future or past movement behavior is estimated for every traffic object that can be recognized on the basis of the sensor data.

10. Method according to claim 1, wherein
the resulting representation is evaluated for determining at least one possible path for at least on traffic object other than the ego vehicle.

11. Driver assistance system comprising:
sensor means for physically sensing an environment of an ego-vehicle,
a representation generation unit, for generating a representation of the environment, comprising a plurality of representation segments and configured to assign characteristic information derived from the sensor data to representation segments,
traffic object future or past movement behavior estimation unit,
inference unit configured to determine for which of the limited areas of the environment no structural characteristic information is generated from the sensor data or structural characteristic information is to be supplemented, to infer structural characteristics for at least one determined limited area of the environment on the basis of the output of the movement behavior estimation unit and assign the structural characteristic information to the representation segment of the representation inferred on the basis of the estimated movement behavior, and
a path evaluation unit for evaluating the resulting representation including all assigned structural characteristics and configured to generate and output an assistance signal.

12. Driver assistance system according to claim 11, wherein
the inference unit is configured to perform inference of structural characteristic information on the basis of the estimated movement behavior only for limited areas of the environment corresponding to representation segments that do not have assigned structural characteristic information derived by analyzing the sensor data.

13. Driver assistance system according to claim 11, wherein
the path evaluation unit is configured to determine the preferred path by generating a plurality of possible paths through the representation connecting a current position of the ego-vehicle with a predetermined waypoint and evaluating on the basis of their quality which is determined as a measure taking into account quality values that describe the usability of each of the representation segments for driving along the respective path.

14. Driver assistance system according to claim 11, wherein the path evaluation unit is configured to determine the preferred path by selecting representation segments step by step starting from the ego-vehicles current position.

15. Driver assistance system according to claim 11, wherein
the path evaluation unit is configured to estimate the future or past movement behavior for every traffic object that can be recognized on the basis of the sensor data.

16. Driver assistance system according to claim 11, wherein
the path evaluation unit is configured to evaluate the resulting representation to determine at least one possible path for at least one traffic object other than the ego vehicle.

* * * * *